United States Patent [19]

Baba

[11] Patent Number: 4,768,913

[45] Date of Patent: Sep. 6, 1988

[54] DESTACKER

[75] Inventor: Kiyokazu Baba, Komatsu, Japan

[73] Assignee: Kabushiki Kaisha Komatsu Seisakusho, Tokyo, Japan

[21] Appl. No.: 10,795

[22] Filed: Feb. 4, 1987

[30] Foreign Application Priority Data

Feb. 10, 1986 [JP] Japan .................................. 61-25991

[51] Int. Cl.$^4$ ............................................. B65H 1/30
[52] U.S. Cl. .................... 414/118; 271/159; 414/121
[58] Field of Search ...................... 414/118, 121, 122; 271/157, 158, 159

[56] References Cited

U.S. PATENT DOCUMENTS

| 580,942 | 4/1897 | Heywood | 271/159 |
|---|---|---|---|
| 2,804,303 | 8/1957 | Henthorn | 271/159 |
| 3,951,401 | 4/1976 | Marass | 271/158 |
| 4,052,051 | 10/1977 | Mersereau et al. | 271/159 |
| 4,260,310 | 4/1981 | Blake et al. | 414/118 |

FOREIGN PATENT DOCUMENTS

| 1095297 | 12/1960 | Fed. Rep. of Germany | 271/159 |
|---|---|---|---|
| 1099556 | 2/1961 | Fed. Rep. of Germany | 271/159 |
| 1251230 | 9/1967 | Fed. Rep. of Germany | 414/121 |
| 46-13857 | 4/1971 | Japan . | |
| 49-20692 | 6/1974 | Japan . | |
| 51-14984 | 2/1976 | Japan . | |
| 52-48388 | 12/1977 | Japan . | |
| 54-12867 | 6/1979 | Japan . | |
| 54-25801 | 8/1979 | Japan . | |
| 56-80927 | 6/1981 | Japan . | |
| 57-42425 | 3/1982 | Japan | 414/118 |
| 58-111138 | 7/1983 | Japan . | |
| 58-138529 | 8/1983 | Japan . | |
| 59-16730 | 2/1984 | Japan . | |
| 60-2119 | 1/1985 | Japan . | |

Primary Examiner—Leslie J. Paperner
Attorney, Agent, or Firm—Ronald P. Kananen

[57] ABSTRACT

A destacker in which each one of a multiplicity of blank sheet materials piled one on another as a stack on a pallet disposed at a predetermined position inside the destacker is lifted by means of an attraction and transported by means of a conveyor to a machining apparatus includes a body frame, a stack receiving section and an empty pallet take-off section mounted respectively on both sides of the body frame and in close proximity to the latter, a stack resting pallet supporting frame section mounted below the inside of the body frame in such a manner as to be moved up and down freely, a stack supporting fork section mounted inside the body frame so as to be slidably moved freely in the horizontal direction and movable up and down freely in the substantially vertically intermediate part of the body frame, a sheet material attraction unit mounted in the upper part of the body frame so as to be moved up and down freely, and a conveyor section with an attraction nature disposed at an upper portion of the body frame and extending substantially in the horizontal direction to the rear end of the destacker.

4 Claims, 10 Drawing Sheets

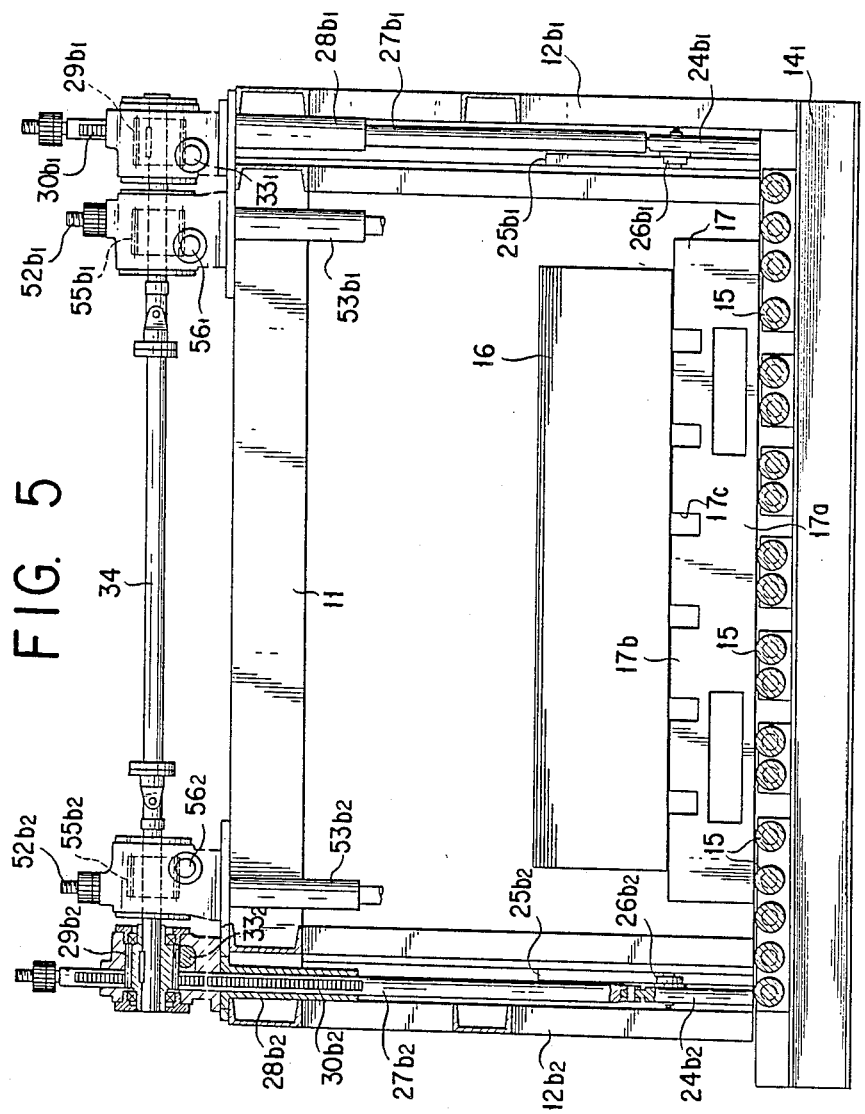

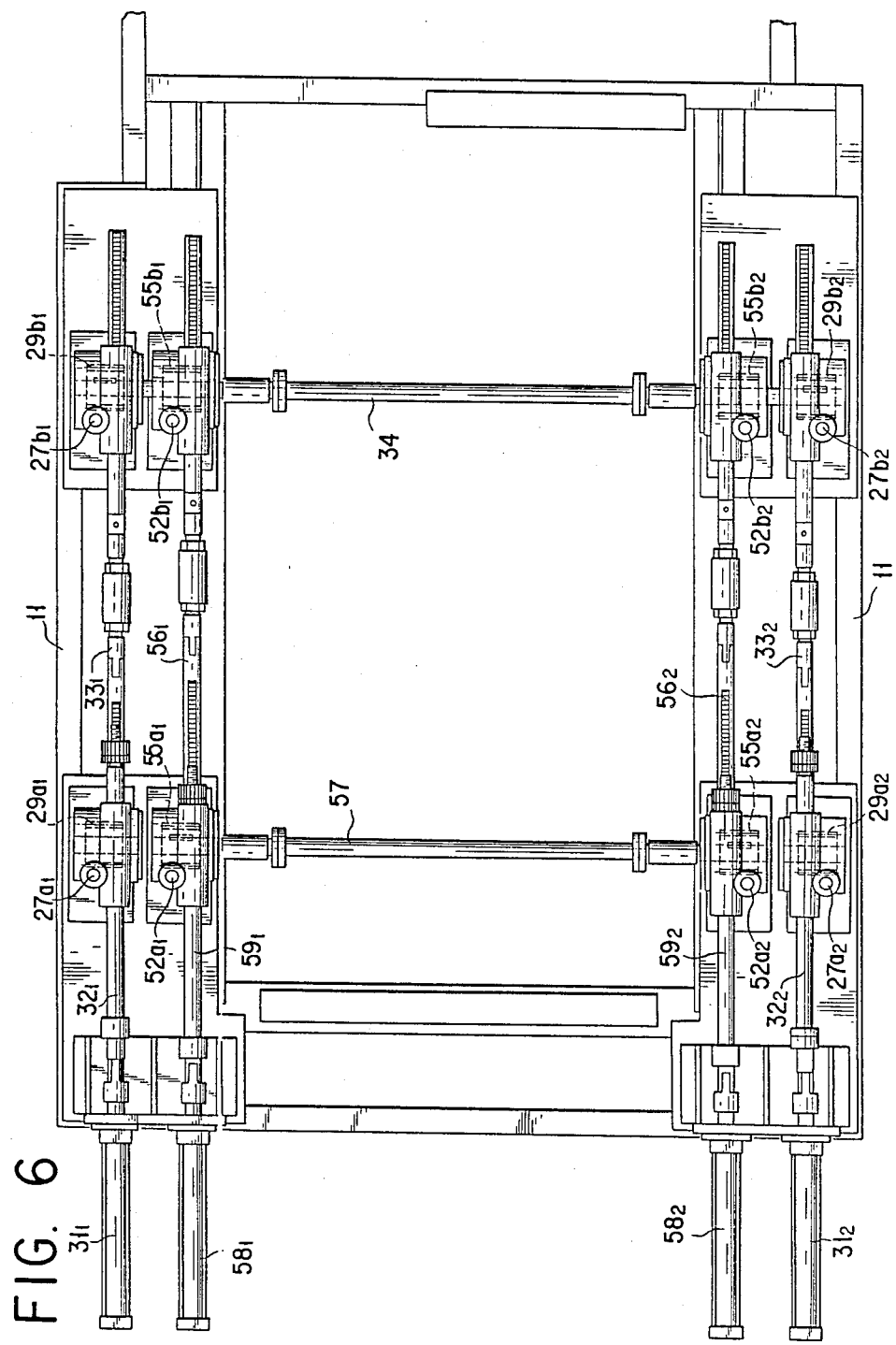

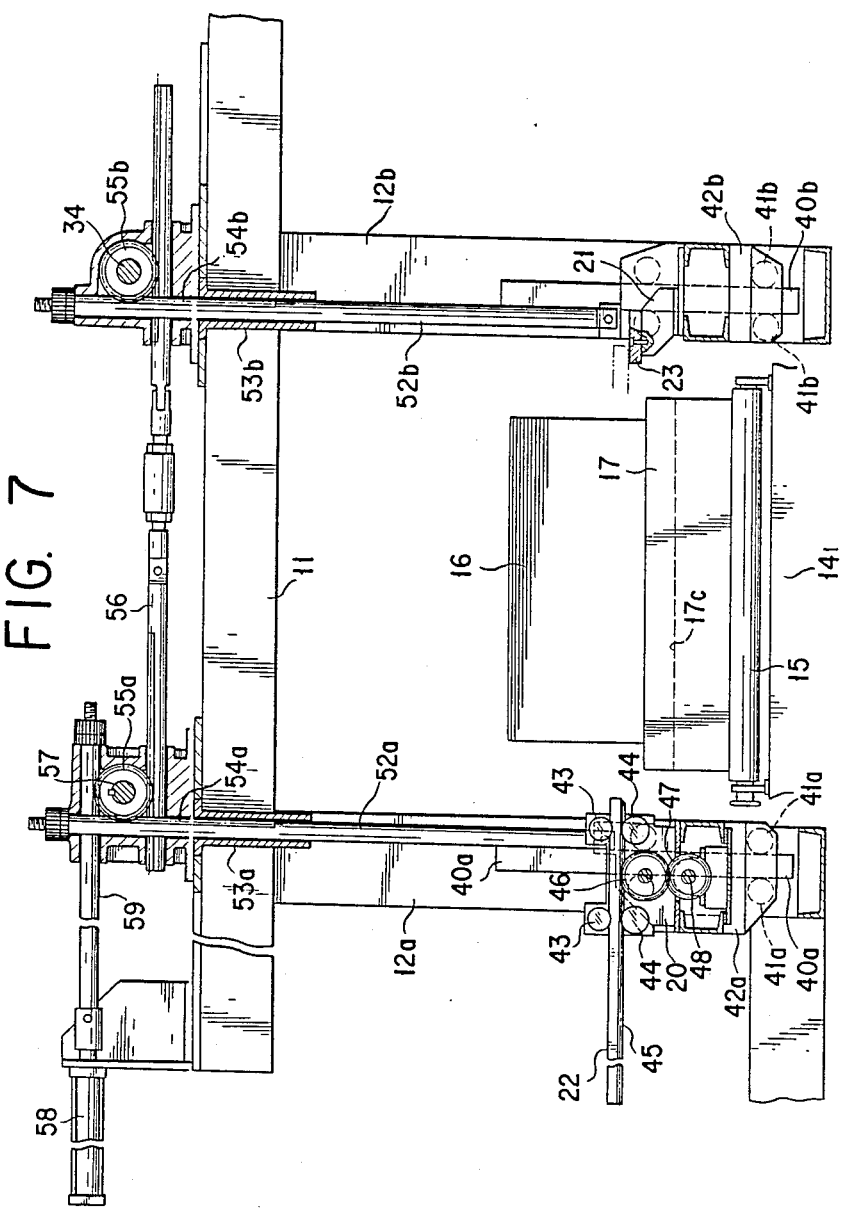

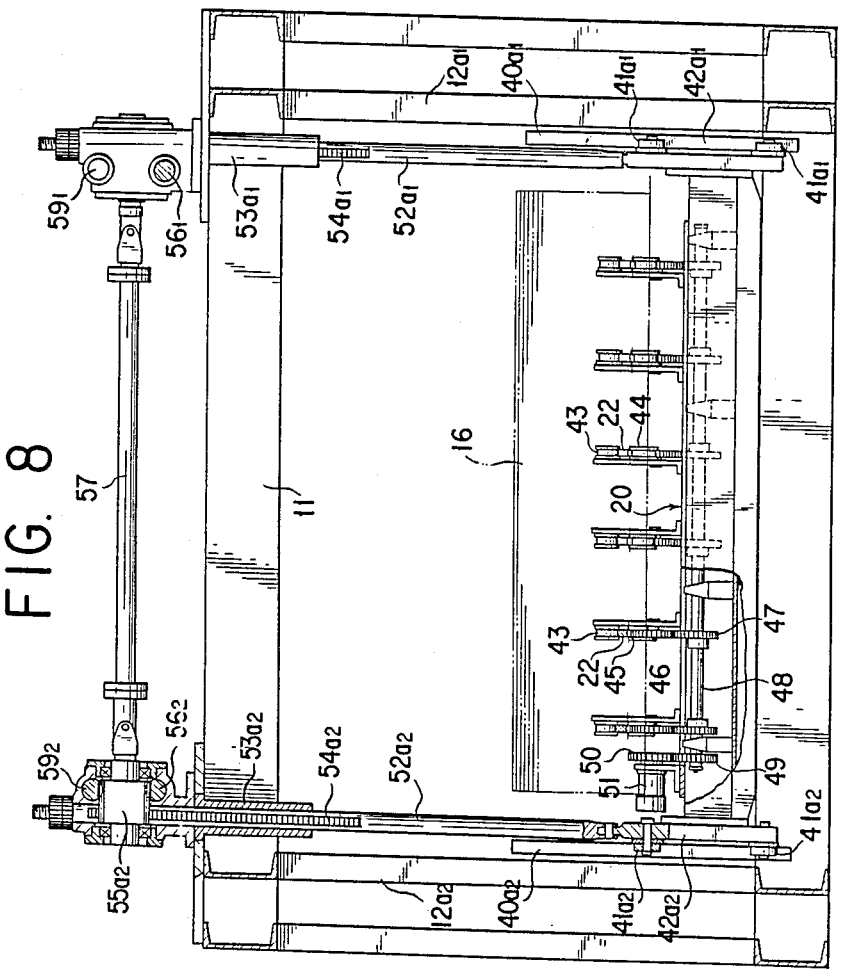

DESTACKER

BACKGROUND OF THE INVENTION

This invention relates to a destacker in which each one of a multiplicity of blank sheet materials piled one on another as a stack on a pallet disposed at a predetermined position within the destacker is lifted by means of a plurality of vertically movable vacuum cups and transported by means of a conveyor to a machining apparatus such as, for example, a press.

In general, in the conveyance of sheet materials by using a destacker, when all the sheet materials on a pallet carried to a predetermined position inside the destacker have been supplied for a machining process, it is necessary to take the empty pallet out from the destacker and carry out a stack supply operation wherein a new pallet loaded with a stack consisting of a plurality of sheet materials is carried into the destacker.

In the case of well-known conventional types of destackers, the above-mentioned stack replenishing operation requires a long time, and the conveyance of sheet materials is suspended during the replenishment of the stack. As a result, the continuous supply of the sheet materials to a press is interrupted, and also suspension of the press operation takes place unavoidably, during the period, thus giving rise to a reduction in the operating rate of the press.

SUMMARY OF THE INVENTION

The present invention has been made in view of the aforementioned circumstances, and has for its object to provide a destacker wherein the stack replenishing operation can be made readily and a continuous supply of sheet materials can be provided without suspension of conveyance thereof even during the period of stack replenishment.

To achieve the above-mentioned object, according to the present invention, there is provided a destacker in which each one of a multiplicity of blank sheet materials piled one on another as a stack on a pallet disposed at a predetermined position inside the destacker is lifted by means of an attraction and transported by means of a conveyor to a machining apparatus, comprising a body frame; a stack receiving section and an empty pallet take-off section mounted, respectively, on both sides of the body frame and in close proximity to the latter; a stack resting pallet supporting frame means mounted below the inside of the body frame in such a manner as to be moved up and down freely; a stack supporting fork means mounted inside the body frame so as to be slidably moved freely in the horizontal direction and movable up and down freely in the substantially vertically intermediate part of the body frame; a sheet material attracting means mounted in the upper part of the body frame so as to be moved up and down freely; and a conveyor means provided with attracting means and disposed at an upper portion of the body frame so as to extend substantially in the horizontal direction to the rear end of the destacker.

The above and many other advantages, features and additional objects of the present invention will become apparent to those skilled in the art upon making reference to the following detailed description and accompanying drawings in which preferred structural embodiments incorporating the principles of the present invention are shown by way of illustrative example.

BRIEF DESCRIPTION OF THE DRAWINGS

FIGS. 4, 5 and 6 are a schematic, partially sectional, elevational side view; a schematic, partially sectional, rear front view; and a schematic plan view, respectively, showing a stack resting pallet supporting frame section used in the destacker according to the present invention;

FIGS. 7 and 8 are a schematic, partially sectional, elevational side view; and a schematic, partially sectional, rear front view, respectively, showing a stack support fork section used in the destacker according to the present invention;

DETAILED DESCRIPTION OF THE INVENTION

Figure 1:
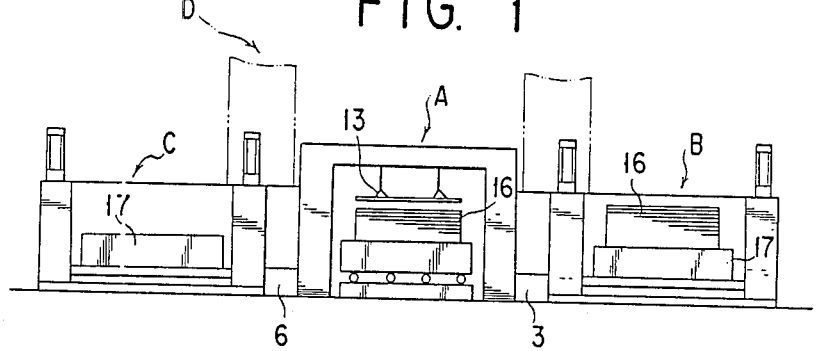
FIGS. 1 and 2 are a schematic front view and a schematic plan view, respectively, showing the whole destacker according to the present invention.
Figure 2:
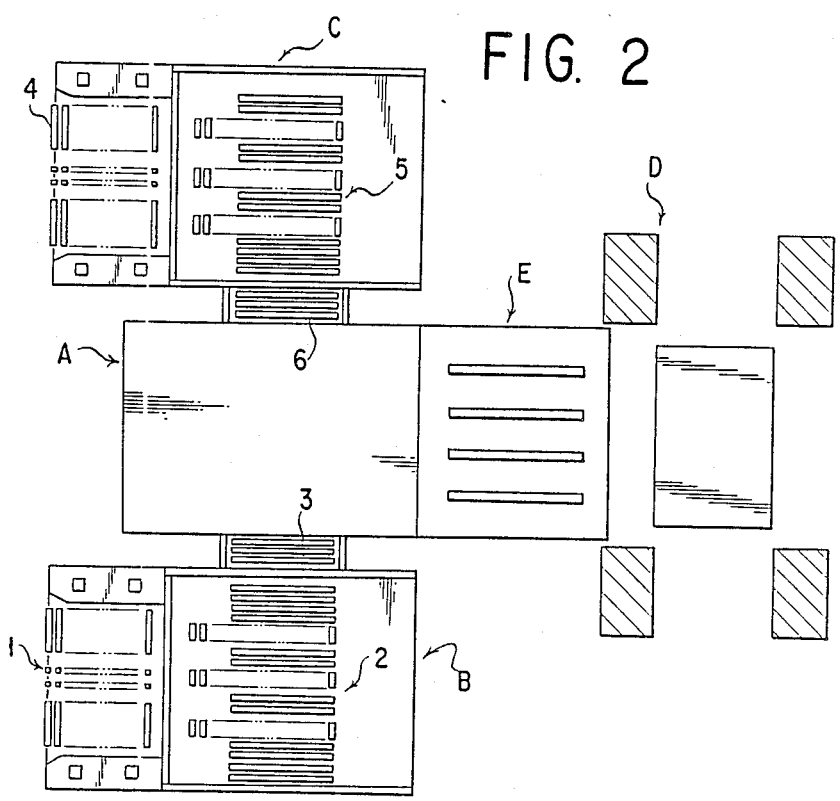

First, with reference to FIGS. 1 and 2, the whole destacker according to the present invention will be described.

On both sides of a destacker A and in close proximity thereto, there are disposed a stack receiving section B and an empty pallet take-off section C, respectively. A sheet material transporting section E is provided between the destacker A and a press D. The stack receiving section B comprises a receiving conveyor 1, a directional control conveyor 2, and a feed conveyor 3. The empty pallet take-off section C comprises a take-off conveyor 4, a directional control conveyor 5 and a take-off conveyor 6.

Figure 3:
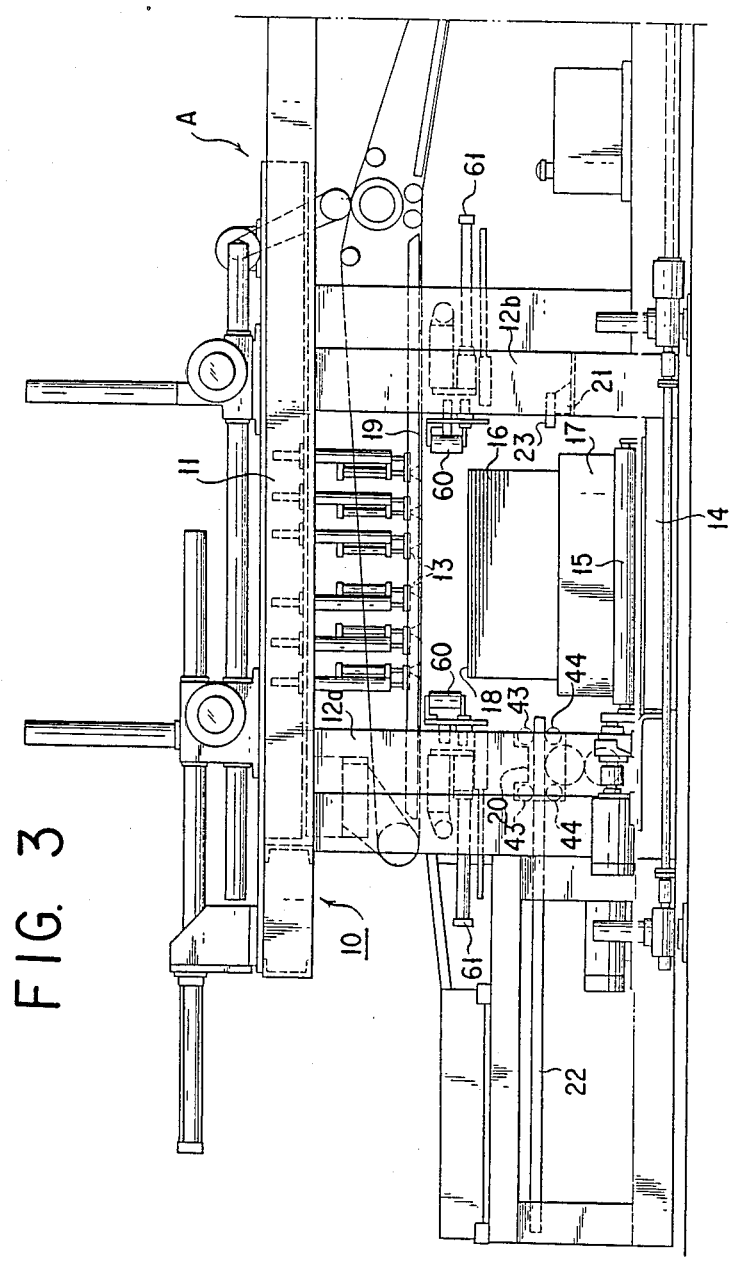
FIG. 3 is a schematic elevational side view showing the principle part of the destacker according to the present invention.

As shown in FIG. 3, the destacker A comprises a body frame 10 which includes a top, horizontal frame member 11 and a plurality of vertical frame members 12a, 12b.

The top, horizontal frame member 11 is provided with a plurality of attracting units 13 such as, for example, vacuum cups, which are vertically freely movable between the vertical frame members 12a and 12b. Further, mounted below the body frame 10 and between the vertical frame members 12a and 12b is a stack resting pallet supporting frame section 14 which can be moved up and down freely along the frame members 12a and 12b. The pallet supporting frame section 14 has a support frame portion 14₁ having a plurality of powered rollers 15 mounted thereon.

The vertical frame members 12a and 12b are located in the front and rear positional relationship (referred to simply as "front" and "rear" hereinbelow) with reference to the direction of conveyance of sheet materials (from the left to the right in FIG. 3). The vertical frame members 12a and 12b are provided with front and rear elevator members 20 and 21, respectively, which are movable up and down freely along the frame members 12a and 12b. The front elevator member 20 has a plurality of horizontally slidable stack supporting forks 22 mounted thereon, whilst the rear elevator member 21 has mounted thereon supporting pieces 23 each being adapted to each of the forks 22.

Figure 4:
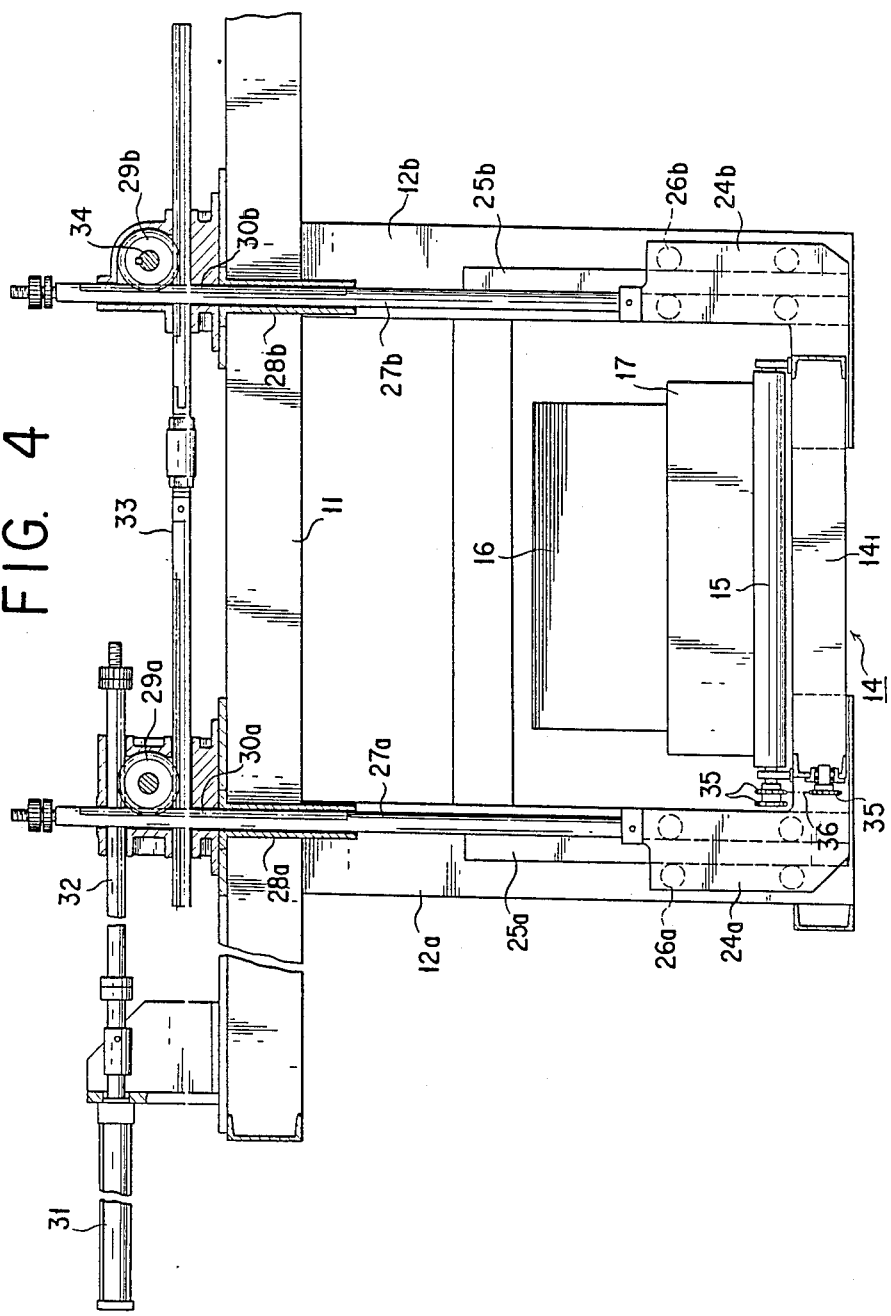

As shown in FIGS. 4 and 5, the pallet supporting frame section 14 is transversely carried between front and rear movable members 24a and 24b which are freely slidable along the front and rear vertical frames 12a and 12b. These movable members 24a and 24b are movable up and down freely along guide rails 25a and 25b, respectively, which are fixedly secured through rollers 26a and 26b to the vertical frame members 12a and 12b, respectively.

Further, fixedly secured to the movable members 24a and 24b, respectively are the lower ends of vertical rods 27a and 27b which are mounted to slide up and down freely through guide bushes 28a and 28b respectively, fixedly secured to the top, horizontal frame member 11. The vertical rods 27a and 27b have rack teeth 30a and 30b of a predetermined length, respectively, formed in the upper portions thereof. These rack teeth 30a and 30b are arranged to mesh with pinions 29a and 29b, respectively, each of which has a wide width or a double construction and which is rotatably mounted on the top, horizontal frame member 11. Further, the pinion 29a is arranged to mesh with a horizontal rack rod 32 which can be reciprocated horizontally by means of a cylindrical actuator 31 fixedly secured to the top, horizontal frame member 11. Further, on the opposite side of the horizontal rack rod 32 with reference to the pinion 29a, there is mounted an interlocking horizontal rack rod 33 which meshes with the pinions 29a and 29b and which can be reciprocated freely in the horizontal direction.

Further, as is obvious from FIG. 6, rear pinions $29b_1$ and $29b_2$ are mounted in the direction at right angles to the direction of conveyance of sheet materials (referred to simply as "in the direction from the left to the right" hereinbelow) The pinions $29b_1$ and $29b_2$ are interconnected by means of a transverse shaft 34.

Thus, all the pinions $29a_1$, $29a_2$, $29b_1$ and $29b_2$ are synchronously rotated by means of actuators $31_1$ and $31_2$ adapted to start them in synchronism, and therefore it becomes possible to move the pallet supporting frame section 14 up and down while it is maintained in horizontal position.

Each of the powered rollers 15 is connected through sprockets 35, 35 and a chain 36 wound round the latter to a motor, not shown.

As shown in FIGS. 7 and 8, the above-mentioned front and rear elevator members 20 and 21 have movable plates 42a and 42b, respectively, which can be moved up and down along guides 40a and 40b of the front and rear vertical frames 12a, 12b. respectively, and through the intermediary of guide rollers 41a, 41b, respectively. The front elevator member 20 is mounted transversely between the left and right movable plates $42a_1$ and $42a_2$, whilst the rear elevator means 21 is mounted transversely between the left and right movable plates $42b_1$ and $42b_2$.

The front elevator member 20 has a plurality of stack supporting forks 22 mounted thereon at intervals of a predetermined space in the transverse direction, and each of the forks 22 is supported by a pair of upper and lower guide rollers 43 and 44 to slide freely to the front and rear. The rack tooth 45 formed on each of the forks 22 meshes with a pinion 46, and each of the pinions 46 meshes with each of gears 47 fixedly secured to the shaft 48 at intervals of a predetermined space. The shaft 48 is connected through a drive gear 49 and a driven gear 50 to the motor 51.

As shown in FIG. 7, the front and rear movable plates 42a and 42b are fixedly secured to one end portions of the vertical rods 52a, 52b, respectively. Whilst, the other end portions of the rods 52a and 52b are supported by guide bushings 53a and 53b, respectively, fixedly secured to the top, horizontal frame member 11, in such a manner as to move up and down freely therealong.

The rack teeth 54a, 54b, formed on the other sides of the vertical rods 52a and 52b, respectively, mesh with pinions 55a and 55b, respectively. Further, the front and rear pinions 55a and 55b are operatively connected by a connecting rack rod 56, whilst the front, left and right pinions $55a_1$ and $55a_2$ are operatively connected by a connecting shaft 57. Further, the front, left and right pinions $55a_1$ and $55a_2$ are connected through rack rods $59_1$ and $59_2$, respectively, to cylindrical actuators $58_1$, $58_2$, respectively, which are fixedly secured to the top, horizontal frame member 11.

Thus, since all the pinions $55a_1$, $55a_2$, $55b_1$ and $55b_2$ are rotated synchronously by means of the actuators $58_1$ and $58_2$ adapted to start them in synchronism with each other to allow the vertical rods $52a_1$, $52a_2$, $52b_1$ and $52b_2$ to move vertically by the same stroke, the front and rear elevator members 20 and 21 are allowed to move up and down by the same stroke in synchronism with each other.

Figure 9A:
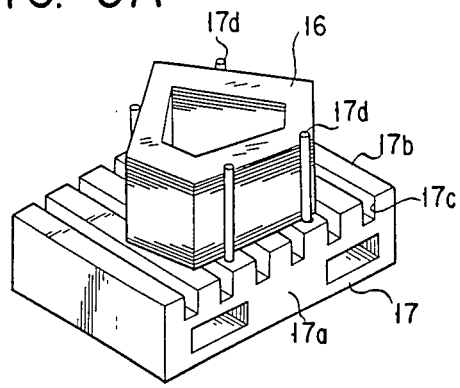
FIGS. 9A and 9B are perspective views, respectively, showing stack resting pallets for use in the destacker according to the present invention.
Figure 9B:
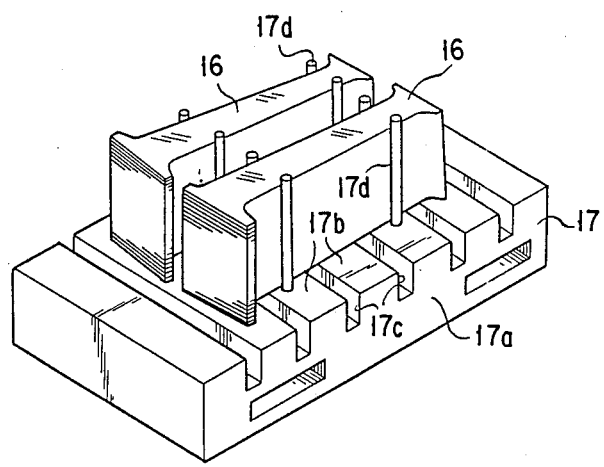
Figure 10:
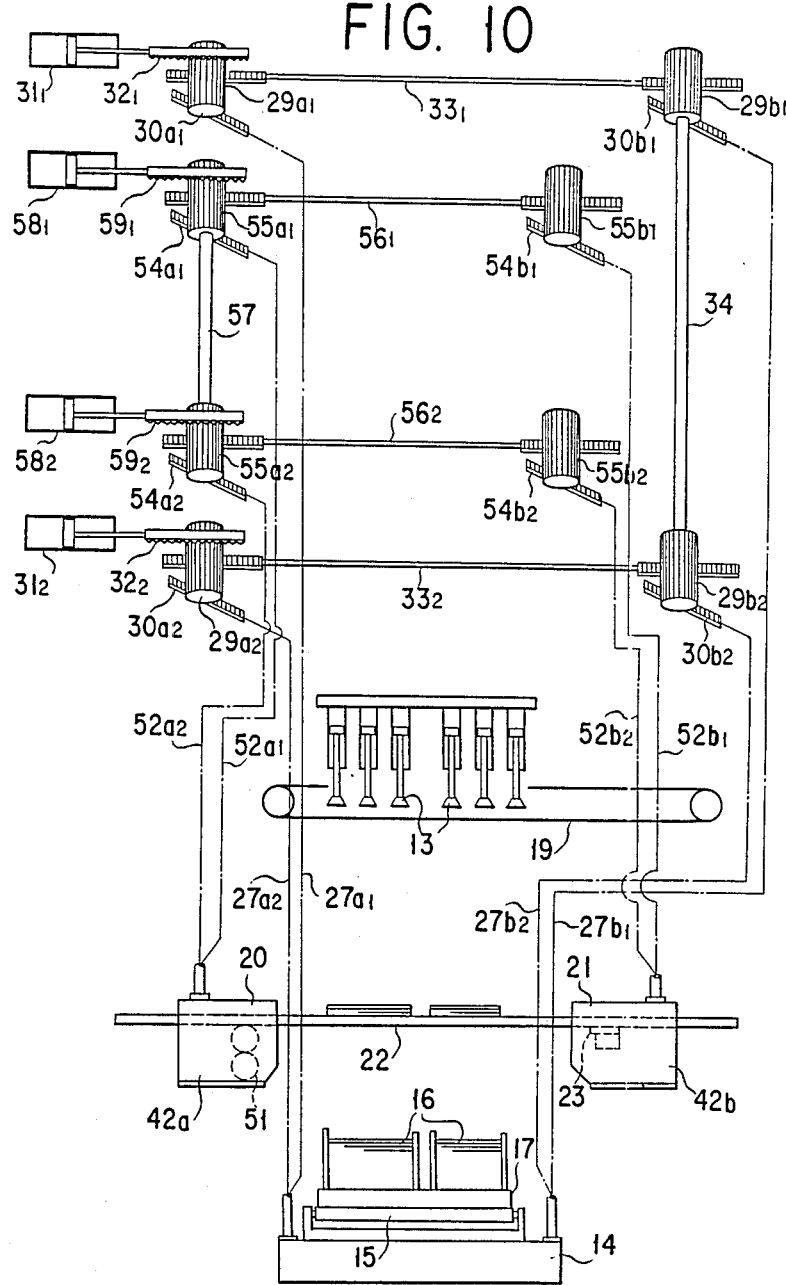
FIG. 10 is a schematic view for explaining the operation of the destacker according to the present invention.

As shown in FIGS. 9A and 9B, a stack resting pallet 17 for use with the aforementioned stacker according to the present invention comprises a body 17 formed integrally with a plurality of upwardly projecting pieces at intervals of a predetermined space to thereby enable a plurality of spaces 17c, which allow for insertion of stack supporting forks 22, to be formed between the pallet 17, and the lower surface of the stack 16 resting thereon. Further, by making it possible to fit a plurality of vertical stack guide rods 17d into the upwardly projecting pieces 17b, one or two pieces of stack or stacks 16 can be placed stably on the pallet 17.

The operation of the destacker according to the present invention with reference to FIGS. 11A to 11D.

Figure 11A:
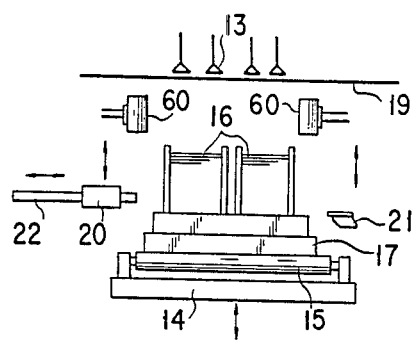
FIGS. 11A to 11D are schematic views for explaining the operation of the destacker according to the present invention.

The pinions $29a_1$, $29a_2$, $29b_1$ and $29b_2$ are forwardly rotated by actuating hydraulic cylinders $31_1$ and $31_2$ to lower the pallet supporting frame means 14, and the motor 51 is reversely rotated to move the stack supporting forks 22 to the left thereby rendering the arrangement as shown in FIG. 11A.

The multiplicity of powered rollers 15 are rotated under this condition to convey the pallet 17 to a predetermined position inside the body frame 10.

Figure 11B:
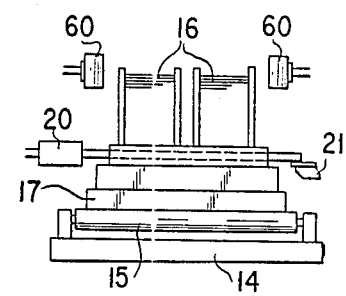

Subsequently, the pinions $29a_1$, $29a_2$, $29b_1$ and $29b_2$ are reversely rotated by means of the hydraulic cylinders $31_1$ and $31_2$ to move upwards the support frame means 14 to allow each of the fork insertion spaces 17c in the pallet 17 and each of the forks 22 to register with each other. After that, the motor 51 is forwardly rotated to allow the forks 22 to pass through the fork insertion spaces 17c and to be supported on the supporting pieces 23 as shown in FIG. 11B.

Pinions $55a_1$, $55a_2$, $55b_1$ and $55b_2$ are intermittently reversely rotated by means of hydraulic cylinders $58_1$ and $58_2$ under this condition to raise the forks 22 intermittently to thereby raise the forks 22 intermittently by a predetermined stroke so that the sheet material 18 may be conveyed one by one to the press D by means of the attracting means 13 and the conveyor 19 in the same manner as the conventional system.

Figure 11C:
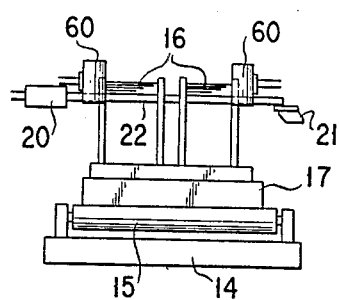
Figure 11D:
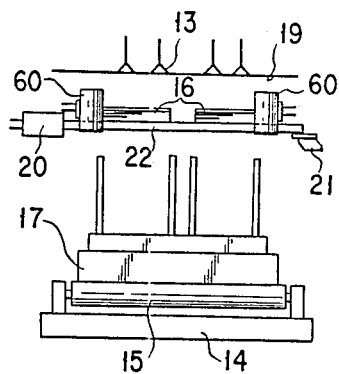

When the sheet materials 18 in the stack 16 have been reduced to a predetermined quantity as shown in FIG. 11C, the support frame means 14 is lowered in the same manner as the aforementioned as shown in FIG. 11D to allow the empty pallet 17 to be taken out, and then another pallet 17 loaded with a new stack 16 to be fed and set therein.

When all the sheet materials 18 in the stack 16 on the forks 22 have been supplied to the machining apparatus, the forks 22 are withdrawn in the same manner as the aforementioned, and at the same time, the support frame means 14 is raised to enable sheet material 18 to be supplied and conveyed from a new stack 16. By so doing, replenishment of stack 16 can be made without suspending the conveyance of the sheet material 18.

At the same time, the front and rear elevator members 20 and 21 are lowered in the same manner as the aforementioned to allow the forks 22 to be disposed opposite to the fork insertion spaces 17c, and then to allow the forks 22 to project and support the stack 16 in preparation for the supply of the next stack 16.

In FIGS. 11A to 11D, reference numerals 60 denote front and rear magnetic floaters adapted to be detachably secured to the vertical frames 12a and 12b, respectively, through their respective cylinder 61 so as to be brought into contact with both end faces of the stack 16 thereby avoiding double-blank.

It is to be understood that the foregoing description is merely illustrative of the preferred embodiments of the present invention and that the scope of the invention is not to be limited thereto. Additional modifications or alternations of the invention will readily occur to one skilled in the art without departing from the scope of the invention.

What is claimed is:

1. A destacker in which each one of a multiplicity of blank sheet materials piled one on another as a stack on a pallet disposed at a predetermined position inside the destacker is lifted by means of an attraction and transported by means of a conveyor to a machining apparatus, comprising:
   (a) a body frame including guide rails;
   (b) a stack receiving section and an empty pallet take-off section mounting, respectively, on both sides of the body frame in close proximity to the latter;
   (c) a stack resting pallet supporting frame means mounted below the inside of the body frame on movable members in such a manner as to be moved up and down freely along said guide rails;
   (d) a stack supporting fork means mounted on said movable members inside the body frame so as to be slidably moved independently of said stack resting pallet supporting frame means freely in the horizontal direction and movable up and down freely in the substantially vertically intermediate part of the body frame;
   (e) a sheet material attracting means mounted in the upper part of the body frame so as to be moved up and down freely;
   (f) a conveyor means with attracting means, said conveyor means being disposed at an upper portion of the body frame and extending substantially in the horizontal direction to the near end of the destacker; and
   (g) a rack and pinion mechanism mounted in vertical frame members of the body frame for elevating and lowering the supporting frame means and the supporting fork means.

2. The destacker as set forth in claim 1 wherein said movable members are freely slidable along the vertical frame members.

3. The destacker as set forth in claim 2 wherein said pallet supporting frame means is transversely carried between said movable members.

4. The destacker as set forth in claim 2 wherein said movable members are fixedly secured through rollers to the vertical frame members.

* * * * *